United States Patent [19]
Tanimura et al.

[11] Patent Number: 5,831,981
[45] Date of Patent: Nov. 3, 1998

[54] FIXED-LENGTH SPEECH SIGNAL COMMUNICATION SYSTEM CAPABLE OF COMPRESSING SILENT SIGNALS

[75] Inventors: Takuji Tanimura; Hiromi Kawabata, both of Tokyo, Japan

[73] Assignee: NEC Corporation, Tokyo, Japan

[21] Appl. No.: 768,158

[22] Filed: Dec. 13, 1996

[30] Foreign Application Priority Data

Dec. 13, 1995 [JP] Japan .................................. 7-324479

[51] Int. Cl.⁶ .................................................. H04Q 11/04
[52] U.S. Cl. ........................ 370/395; 370/433; 370/463; 370/474
[58] Field of Search .................................. 370/395, 433, 370/463, 474, 434, 465; 704/200, 208, 210, 214, 215

[56] References Cited

U.S. PATENT DOCUMENTS

| | | | |
|---|---|---|---|
| 5,121,385 | 6/1992 | Tominaga et al. | 370/433 |
| 5,436,899 | 7/1995 | Fujino et al. | 370/433 |
| 5,649,055 | 7/1997 | Gupta et al. | 704/215 |

FOREIGN PATENT DOCUMENTS

| | | |
|---|---|---|
| 1-241240 | 6/1989 | Japan . |
| 2-2758 | 1/1990 | Japan . |
| 2-4064 | 1/1990 | Japan . |
| 3-98355 | 4/1991 | Japan . |
| 4-49736 | 2/1992 | Japan . |
| 4-179343 | 6/1992 | Japan . |
| 4-357735 | 12/1992 | Japan . |
| 4-362830 | 12/1992 | Japan . |
| 5-30137 | 2/1993 | Japan . |
| 9-64911 | 3/1997 | Japan . |

*Primary Examiner*—Chi H. Pham
*Assistant Examiner*—Ricky Ngo
*Attorney, Agent, or Firm*—Foley & Lardner

[57] ABSTRACT

In a fixed-length speech signal communication system, in a transmitting mode, background noise components are detected from a transmitting signal, and a silent signal is generated when the duration of the detected background noise components is longer than a first value. Also, when the silent signal is not generated, fixed-length cells are assembled for the transmitting signal. In a receiving mode, received fixed-length cells are reassembled to recover receiving signals. When fixed-length cells have not been received for a time equal to a second value, a background noise insertion signal is generated. As a result, when the background noise insertion signal is generated, so that background noise components are generated and transmitted instead of the receiving signals.

5 Claims, 3 Drawing Sheets

FIXED-LENGTH SPEECH SIGNAL COMMUNICATION SYSTEM CAPABLE OF COMPRESSING SILENT SIGNALS

BACKGROUND OF THE INVENTION

1. Field of the Invention

The present invention relates to a fixed-length speech signal communication system such as an asynchronous transfer mode (ATM) system, and more particularly, to the compression of silent signals thereof.

2. Description of the Related Art

In a prior art variable-length speech signal communication system, in order to alleviate the inharmoniousness of a called party due to silent signals, background noise packets are assembled for a long silent signal and are transmitted. Then, in a receiving side, background noise packets are reassembled to recover background noise (see: JP-A-1-241240 & JP-A-4-357735). Also, a background noise component is periodically added as a noise level code to a packet, and in a receiving side, the noise level code is recovered.

In the prior art variable-length speech signal communication system, however, since packets for silent signals are transmitted, the compression of silent signals is not sufficient. In addition, the compression of silent signals in the variable-length speech signal communication system cannot be applied to a fixed-length speech signal communication system such as an ATM.

SUMMARY OF THE INVENTION

It is an object of the present invention to provide a compression of silent signals in a fixed-length speech signal communication system.

According to the present invention, in a fixed-length speech signal communication system, in a transmitting mode, background noise components are detected from a transmitting signal, and a silent signal is generated when the duration of the detected background noise components is longer than a first value. Also, when the silent signal is not generated, fixed-length cells are assembled for the transmitting signal. In a receiving mode, received fixed-length cells are reassembled to recover receiving signals. When fixed-length cells have not been received for a time equal to a second value, a background noise insertion signal is generated, so that background noise components are generated and transmitted instead of the receiving signals.

Since fixed-length cells are not generated for silent signals, the compression of silent signals is enhanced, so that effective use can be made of limited networks.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENT

Figure 1:
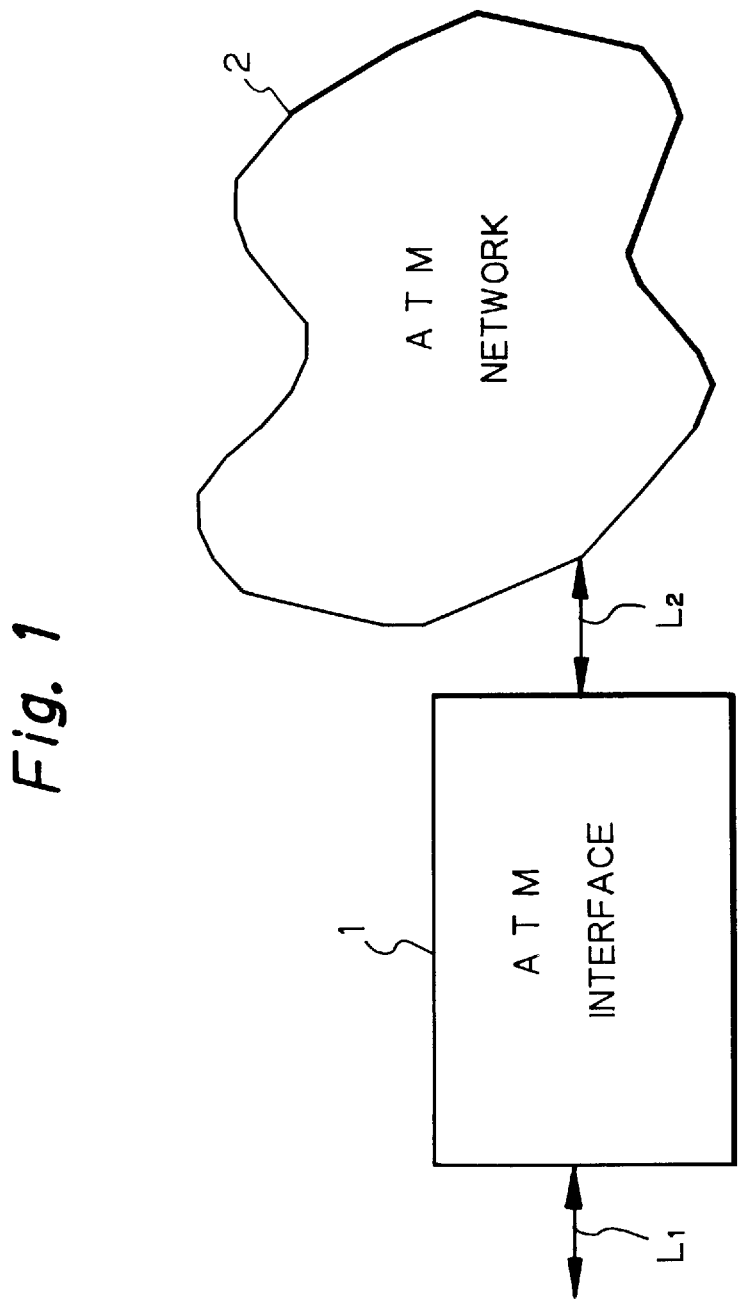
FIG. 1 is a diagram illustrating an embodiment of the fixed-length speech signal communication system according to the present invention.

In FIG. 1, reference numeral 1 designates an ATM interface connected between a speech signal line $L_1$ and a cell data line $L_2$. Also, connected to the ATM interface 1 is an ATM network 2. An ATM cell propagates on the cell data line $L_2$.

Figure 2:
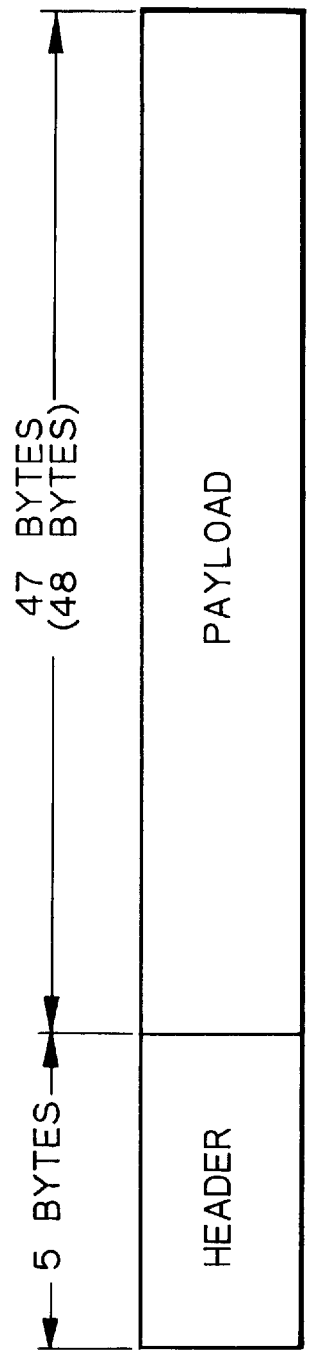
FIG. 2 is a data format of an ATM cell used in the system of FIG. 1.

The ATM cell corresponds to a variable-length packet of the variable-length speech signal communication system; however, as shown in FIG. 2, the ATM cell has a fixed-length of 52 (53) bytes formed by a header of 5 bytes and a payload of 47 (48) bytes.

Figure 3:
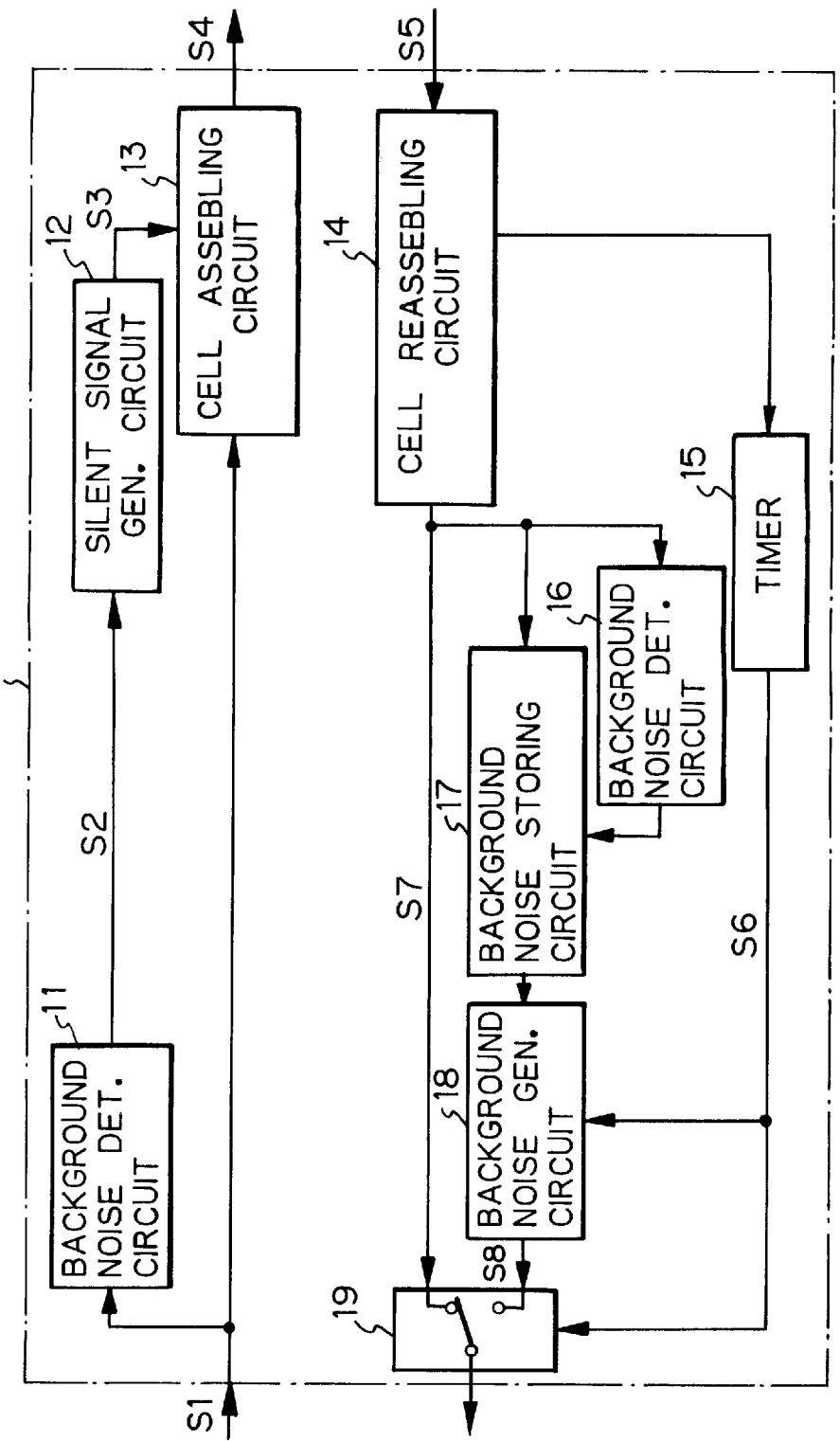
FIG. 3 is a detailed block circuit diagram of the ATM interface of FIG. 1.

In FIG. 3, which is a detailed block circuit diagram of the ATM interface 1 of FIG. 1, a background noise detecting circuit 11 receives a transmitting signal S1 including speech components and background noise components, and detects the background noise components from the transmitting signal S1. As a result, the background noise detecting circuit 11 generates a background noise detection signal S2.

A silent signal generating circuit 12 monitors the background noise detection signal S2. That is, the silent signal generating circuit 12 determines whether or not a duration of the background noise components is longer than a value which corresponds to 46 bytes or 47 bytes of FIG. 2. As a result, when this duration is longer than 46 or 47 bytes, the silent signal generating circuit 12 generates a silent signal S3. In other words, when at least one of the 47 bytes or the 48 bytes is a speech component, the silent signal generating circuit 13 does not generate the silent signal S3. Note that a speech component in AL1 mode is 47 bytes, and a speech component is 48 bytes in AL5 mode.

In accordance with the silent signal S3, a cell assembling circuit 13 assembles ATM cells S4 as shown in FIG. 2 for the transmitting signal S1. In this case, when the silent signal S3 is not generated, the cell assembling circuit 13 is operated, so that the ATM cells S4 are transmitted to the ATM network 2 of FIG. 1.

Thus, in a transmitting mode, background noise components are detected from a transmitting signal S1, and a silent signal S3 is generated when the duration of the detected background noise components is longer that the abovementioned value. Also, when the silent signal S3 is not generated, ATM cells are assembled for the transmitting signal S1.

A cell reassembling circuit 14 receives ATM cells S5 from the ATM network 2 of FIG. 1. The cell reassembling circuit 14 reassembles the ATM cells S5 to recover receiving signals including speech components and background noise components. In this case, every time the cell reassembling circuit 14 reassembles one ATM cell, the cell reassembling circuit 14 clears a timer 15.

Note that a value corresponding to an expected maximum time interval of ATM cells is set in the timer 15 in advance. Therefore, when the cell reassembling circuit 14 has not received any ATM cell for a time period larger than the expected maximum time interval, the timer 15 overflows to generate a background noise insertion signal S6.

On the other hand, a background noise determining circuit 16 determines whether the output signal S7 of the cell reassembling circuit 14 constitutes background components or speech components. Only when the output signal S7 constitutes background components, is a background noise storing circuit 17 operated by the background noise determining circuit 16 to store the background components.

A background noise generating circuit 18 generates a background noise signal S8 in accordance with the content of the background noise storing circuit 17.

One of the output signal S7 of the cell reassembling circuit 14 and the background noise signal S8 is selected by a selector 19. That is, when the background noise insertion signal S6 is not generated, the selector 19 is located at an upper location, so that the background noise generating circuit 18 is operated and the background noise signal S8 thereof passes through the selector 19.

Thus, in a receiving mode, the received ATM cells S5 are reassembled to recover receiving signals S7. When ATM cells have not been received for the expected maximum time interval, a background noise insertion signal S6 is generated. As a result, when the background noise insertion signal S6 is generated, background noise components are generated based upon the background noise included in the payloads of the ATM cells, and is transmitted instead of the receiving signals.

As explained hereinabove, according to the present invention, since cells for silent signals are not transmitted, the compression of silent signals can be sufficient.

We claim:

1. A fixed-length speech signal communication system comprising:

a background noise detecting means for receiving a transmitting signal including first speech components and first background noise components to detect said first background noise components;

a silent signal generating means, connected to said background noise detecting means, for generating a silent signal when a duration of said detected first background noise components is longer than a first value;

a cell assembling means, connected to said silent signal generating means, for assembling first fixed-length cells for said transmitting signal when said silent signal is not generated;

a cell reassembling means for reassembling second fixed-length cells to regenerate receiving signals including second speech components and second background noise components; and a signal generating means, connected to said cell reassembling means, for transmitting said receiving signals when said cell reassembling means receives said second fixed-length cells within a predetermined time interval and for transmitting third background noise components when said cell reassembling means receives said second fixed-length cells within a time interval larger than said predetermined time interval.

2. A fixed-length speech signal communication system comprising:

a background noise detecting means for receiving a transmitting signal including first speech components and first background noise components to detect said first background noise components;

a silent signal generating means, connected to said background noise detecting means, for generating a silent signal when a duration of said detected first background noise components is longer than a first value;

a cell assembling means, connected to said silent signal generating means, for assembling first fixed-length cells for said transmitting signal when said silent signal is not generated;

a cell reassembling means for reassembling second fixed-length cells to regenerate receiving signals including second speech components and second background noise components;

a timer means, connected to said cell reassembling means, for generating a background noise insertion signal when said cell reassembling means has not received fixed-length cells within a duration having a second value; and a signal generating means, connected to said cell reassembling means and said timer means, for transmitting said receiving signals when said background noise insertion signal is not generated and transmitting third background noise components when said background noise insertion signal is generated.

3. The system as set forth in claim 2, wherein said signal generating circuit comprises:

a background noise determining means, connected to said cell reassembling means, for determining whether or not said receiving signals are background noise components;

a background noise storing means, connected to said cell reassembling means and said background noise determining means, for storing said background noise components when said receiving signals are background noise components;

a background noise generating means, connected to said background noise storing means, for generating said third background noise components with a content of said background noise storing means; and a selector means, connected to said cell reassembling means, said background noise generating means and said timer means, for passing said receiving signals when said background noise insertion signal is not generated and passing said third background noise components when said background noise insertion signal is generated.

4. An asynchronous transfer mode (ATM) communication system comprising:

a background noise detecting means for receiving a transmitting signal including first speech components and first background noise components to detect said first background noise components;

a silent signal generating means, connected to said background noise detecting means, for generating a silent signal when a duration of said detected first background noise components is longer than a first value;

a cell assembling means, connected to said silent signal generating means, for assembling first ATM cells for said transmitting signal when said silent signal is not generated;

a cell reassembling means for reassembling second ATM cells to regenerate receiving signals including second speech components and second background noise components;

a timer means, connected to said cell reassembling means, for generating a background noise insertion signal when said cell reassembling means has not received ATM cells within a second value corresponding to 47 or 48 bytes of said ATM cells; and a signal generating means, connected to said cell reassembling means and said timer means, for transmitting said receiving signals when said background noise insertion signal is not generated and transmitting third background noise components when said background noise insertion signal is generated.

5. The system as set forth in claim 4, wherein said signal generating circuit comprises:

a background noise determining means, connected to said cell reassembling means, for determining whether or not said receiving signals are background noise components;

a background noise storing means, connected to said cell reassembling means and said background noise determining means, for storing said background noise components when said receiving signals are background noise components;

a background noise generating means, connected to said background noise storing means, for generating said third background noise components with a content of said background noise storing means; and a selector means, connected to said cell reassembling means, said background noise generating means and said timer means, for passing said receiving signals when said background noise insertion signal is not generated and passing said third background noise components when said background noise insertion signal is generated.

* * * * *